Sept. 8, 1970　　　EIZO GOTO ET AL　　　3,527,590
APPARATUS FOR MELTING GLASS
Filed April 20, 1967　　　　　　　　　　　3 Sheets-Sheet 1
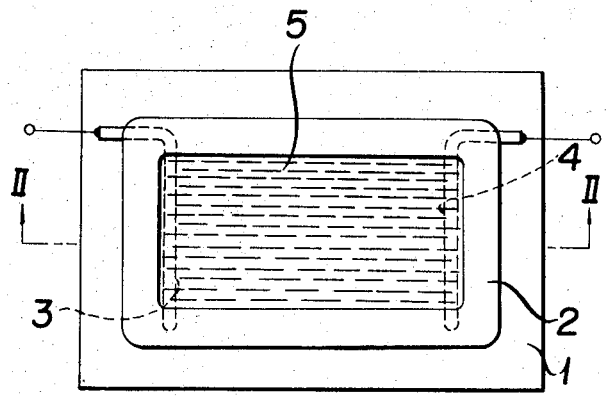
FIG. 1
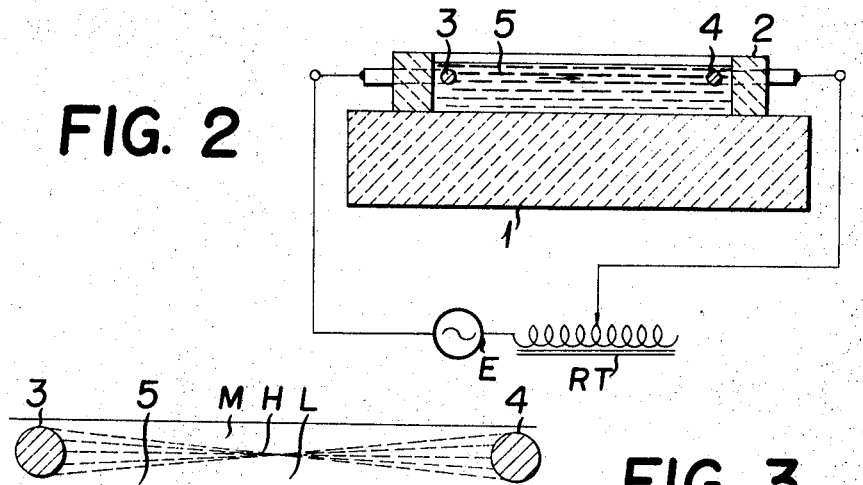
FIG. 2
FIG. 3
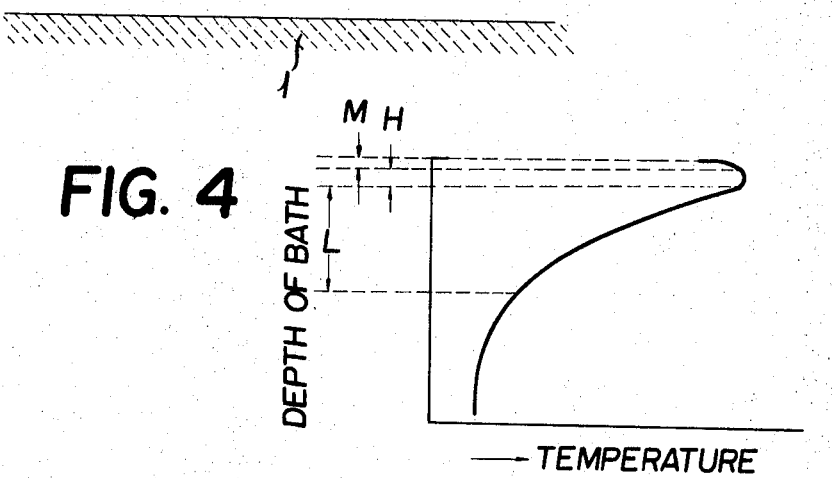
FIG. 4
INVENTOR.
Eizo Goto
BY George B. Auyoub
attorney Sept. 8, 1970   EIZO GOTO ET AL   3,527,590
APPARATUS FOR MELTING GLASS
Filed April 20, 1967   3 Sheets-Sheet 3

INVENTOR.
Eizo Goto
BY George B. Oujevolk
Attorney

United States Patent Office 3,527,590
Patented Sept. 8, 1970

3,527,590
APPARATUS FOR MELTING GLASS
Eizo Goto, Chigasaki-shi, Japan, assignor to Tokyo Shibaura Electric Co., Ltd., Kawasaki-shi, Japan, a corporation of Japan
Filed Apr. 20, 1967, Ser. No. 632,381
Claims priority, application Japan, Apr. 25, 1966, 41/25,899; May 4, 1966, 41/27,954; May 31, 1966, 41/34,701; Aug. 17, 1966, 41/53,664; Aug. 31, 1966, 41/57,223; Oct. 29, 1966, 41/71,262
Int. Cl. C03b 5/02, 5/22
U.S. Cl. 65—337          2 Claims

ABSTRACT OF THE DISCLOSURE

A method of melting glass contained in a vessel comprising the steps of heating from outside the raw material of glass, thus rendering electroconductive at least the surface layer portion thereof, and passing electric current through said surface layer portion to heat it from inside so as to heat said portion to a temperature exhibiting a viscosity suitable for various types of working.

BACKGROUND OF THE INVENTION

This invention relates to melting glass by an electric current passing through it and more particularly to a novel method of and apparatus for melting glass which are particularly suitable for performing various operations such as sealing, welding, forming of a glass film and the like by dipping articles to be worked in a bath of molten glass.

Melting of glass is generally effected by heating from outside a crucible or furnace containing raw material of glass a suitable heating means such as an electric heater or by directing a burner flame onto the surface of the raw material of glass. However, as the heating of the crucible from the outside may cause excessive heating of the crucible, components of relatively low melting points contained in the crucible dissolve in the bath of molten glass so that the glass bath contains undesirable impurities. On the other hand where burner flame is directed to the surface of the glass bath this above difficulty, due to excessive heating of the crucible, would not occur. However, in this case a portion of burnt gas from the burner enters into the glass bath, thus again resulting in variations in the composition of the bath. Thus, it is difficult to form a melting condition on the surface of the glass bath suitable for various types of working.

SUMMARY OF THE INVENTION

It is therefore the principal object of this invention to provide a method of melting glass capable of greatly decreasing contamination by impurities in the bath of molten glass while at the same time capable of establishing a condition suitable for various operations in the surface layer of the glass bath.

Generally speaking, the method comprises the steps of rendering electroconductive at least a portion of the raw material of glass contained in a vessel of refractory material by heating from outside and then heating said portion by selectively passing electric current therethrough so that the surface layer portion of the glass bath may have a viscosity suitable for various types of working. The surface portion and portions adjacent thereto of the glass bath formed by melting the raw material in accordance with this method is heated to a temperature due to the balance between heating of Joule effect of electric current flowing through said portions and dissipation or conduction of heat to an atmosphere present on the surface of the bath, said temperature being sufficient to provide a viscosity suitable for performing various operations, such for example, as taking out the molten glass from the bath for working into glass wares, or dipping an opened end of a tube into the molten glass to form a glass film on said opened end or other operations. Since portions of molten glass underlying the surface portion are heated by an electric current flowing therethrough and since the temperature of these portions is not affected by the dissipation of heat to the surrounding atmosphere the temperature of these portions is maintained at a higher temperature than that of the surface portion. Consequently, as the molten glass in the surface layer is raised from the bath, the glass in this layer is readily separated from the underlying body of molten glass. Further, as the portion of molten glass between said portion of high temperature and the bottom of the vessel is not appreciably or entirely heated by electric current there is no fear of overheating the internal wall of the vessel thus effectively preventing dissolving of impurities contained in the vessel into molten glass.

Further, this invention provides an apparatus suitable for carrying out the method described above. The melting device according to this invention comprises a vessel of a refractory material adapted to contain a bath of molten glass and a pair of electrodes located at a position corresponding to the surface layer portion of the glass bath in the vessel, said electrodes being connected across a source of electric supply to pass electric current through the surface layer portion of a magnitude sufficient to heat said layer to a temperature that results in a viscosity most suitable for various types of working.

Accordingly, one of the objects of this invention is to provide a novel method of melting glass wherein the surface layer portion of the bath is heated to a temperature providing an appropriate viscosity as required by various workings.

Another object of this invention is to provide an improved method of melting glass by which contamination of impurities into the bath is essentially precluded.

Still another object of this invention is to provide a method of melting glass wherein temperature control of the bath can be done readily and positively.

Yet another object of this invention is to provide an apparatus for melting glass capable of selectively heating glass without contaminating with impurities the surface layer portion of the bath.

Still another object of this invention is to provide a novel apparatus capable of melting glass so that the surface layer portion of the molten glass bath may have a uniform viscosity over the entire surface thereof.

Yet another object of this invention is to provide an apparatus for melting glass wherein the vessel containing the bath of molten glass is protected against damage caused by excessive heating.

BRIEF DESCRIPTION OF THE DRAWINGS

FIG. 1 shows a plan view of a glass melting apparatus embodying this invention;

FIG. 2 shows a sectional view, taken along the line 2—2 of the apparatus shown in FIG. 1 together with an associated electrical circuit;

FIG. 3 is a diagram to illustrate a path of electrical current flowing through the bath of moltein glass between a pair of electrodes of the apparatus shown in FIGS. 1 and 2;

FIG. 4 is a plot to illustrate the relation between the depth of the bath of molten glass and temperature;

DESCRIPTION OF THE PREFERRED EMBODIMENTS

Figure 5:
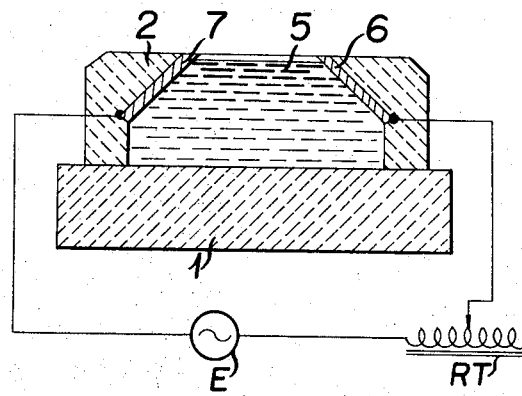
FIG. 5 shows a longitudinal section of a modified glass melting apparatus of this invention together with an associated electrical circuit.

As shown in FIGS. 1 and 2 of the accompanying drawings the glass melting apparatus of this invention includes a base 1 made of refractory bricks and a rectangular frame member 2 of sintered chamotte and fixed on said base 1. A space is formed in the frame member 2 to contain a bath of molten glass 5 and a pair of electrodes 3 and 4 made of circular rods of electric conductor are mounted on the inside of narrower side walls of the frame member at positions just below the liquid level of the glass bath 5, one end of each of said electrodes extending outwardly through the side wall. One electrode 3 is connected to one pole of a source of electric supply while the other electrode is connected to the opposite pole of the source through a variable reactor RT.

In operation of the glass melting apparatus the raw material of glass, for example, a powdery raw material essentially consisting of $SiO_2$, $BO_3$ and $PbO$ is charged in the frame member in a proper amount so as to form a bath having a liquid level slightly higher than the upper surface of the electrodes 3 and 4. The raw material of glass is heated by external heating means such as a burner flame directed to the surface thereof such that the surface layer of the charged raw material becomes electroconductive. Thereafter a suitable voltage from the source E is impressed across electrodes 3 and 4 immersed in the raw material of glass. This voltage will cause electric current to flow between electrodes 3 and 4 through the raw material which has been melted by the burner flame. Due to the Joule heat of this current the raw material of glass will be heated quickly to form the bath of molten glass.

During this heating by electric current, since the temperature resistance characteristic of glass is negative and since the current is concentrated at the surface layer portion which has been heated to an elevated temperature, due to burner flame the temperature of the surface portion increases very rapidly. As diagrammatically shown in FIG. 3 the current flowing through the bath of molten glass concentrates at a portion H on a straight line corresponding to the shortest distance between electrodes 3 and 4 no current flows through portions M and L respectively above and below this line. Consequently, the temperature of the bath is highest at the portion H, the temperature of the portion M is elevated to a somewhat lower temperature by connection and that of the portion L is the lowest. The relation between the depth of the bath and the temperature is shown by a curve shown in FIG. 4.

In the initial stage of current flow, the resistance of the surface layer of the bath 5 is relatively high because it is not yet heated to a sufficiently high temperature so that it is necessary to impress a relatively high voltage across electrodes 3 and 4 in order to supply a definite power to the bath 5. As heating is continued, current is increased in response to the decrease in resistance resulting in the decrease in the voltage applied across the electrodes by the action of the reactor RT until a stable condition is reached wherein the heat quantity lost from the molten glass bath 5 by conduction and radiation and the heat quanity generaed by the Joule effect of the current flowing through the bath balance cancel each other. The electric power supplied to the bath should be controlled so that the surface layer portion of the bath 5 will be heated to a temperature which provides a viscosiy suitable for various working. This can be done by suitably selecting electrical characteristics of the source E and the reactor RT dependent upon the thermal condition of the bath.

Some experiments to find out proper current passing conditions for heating by electric current have carried out. Thus, use was made of a melting device including a pair of parallel electrodes spaced 30 mm. apart each consisting of a molybdenum rod of 25 mm. long. A glass raw material having a softening temperature of 510° C. and a coefficient of expansion of $9.8 \times 10^6/°$ C. was charged in the melting device to a depth to submerge the electrodes. The raw material was heated by directing to its surface a flame produced by burning a mixture of coal gas and oxygen by burners. After the surface layer portion of the raw material was heated, the burner flames were removed and a voltage of 260 volts was applied across electrodes from a suitable source of alternating current supply. This voltage was decreased to 48 volts after three minutes and the current flowing between electrodes at this time was 10 amperes. As a result, a bath of molten glass was formed in a zone of 25 mm. wide and 30 mm. long and the temperature of the surface layer portion of the bath ranged from 1200 to 1300° C. At these temperatures, the viscosity of molten glass was 50 poises or less which is suitable for various types of working, for example to dip an opened end of an article to be worked in the bath and then pull it up to form a glass film at the opened end.

It should be particularly noted that in this example heating of the raw material is limited only to portions of the raw material required for working and the base 1 and the frame member 2 are not heated excessively so that there is no contamination of the glass bath by impurities from the refractory material. Further, as the heating of the raw material by means of the burner is utilized only for the purpose of decreasing the resistance of the raw material to permit heating thereof by electric current, the amount of impurities that may enter into the bath is negligibly small.

FIG. 5 shows a modified melting device including electrodes that can more effectively heat the surface layer portion of the bath. In this figure, portions of the apparatus substantially the same as those shown in FIGS. 1 and 2 are designated by the same reference numerals. Inner surfaces of opposing walls of the frame member 2 converge and a pair of plate shaped electrodes 6 and 7 are mounted on these converging surfaces.

When a voltage is impressed across two electrodes 6 and 7 the current density flowing between electrodes through the bath is the maximum at the surface thereof and decreases with the depth because the distance between the electrodes is the minimum at the surface of the bath 5 contained in the frame member 2 and increases with the depth of the bath. Moreover, as the electrodes 6 and 7 are inclined with reference to a free surface the current density per unit surface area of the electrodes becomes small so that erosion of the electrodes due to molten glass is greatly decreased.

The angle between the surface of the electrodes 6 and 7 and the liquid surface of the bath may be selected within a range of 120° to 160° dependent upon the distance between electrodes, composition of the glass and other factors. As the angle becomes larger the variation in the current density with respect to the depth becomes remarkable so that when this angle is excessively large, the current will concentrate to portions of the electrodes which are spaced at a minimum distance thus resulting in severe erosion of these portions. Where the electrodes are made of molybdenum, for example, a brown colored product is formed at the surface portion thereof by the reaction between molybdenum and glass, the product deteriorates the characteristics of glass. However, where the angle between the electrodes and the liquid surface of the bath is selected from aforementioned range, production of such a product can be reduced to one third or less when compared with that of rod shaped electrodes.

Where it is desirable to provide a bath of molten glass of small cross-section but of wide area, in order to prevent excessive increase in the electrical resistance it is preferable to use long electrodes rather than increasing the spacing between electrodes.

However, even when long electrodes are used it is not possible to make the resistance of the bath between electrodes uniform, thus resulting in coexistence of molten portions having lower viscosity than other molten portions in the bath.

Figure 6:
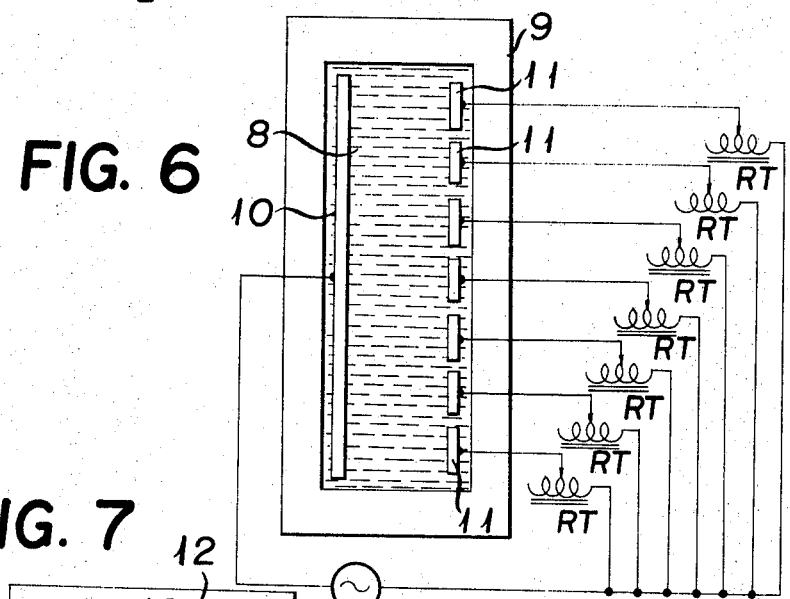
FIG. 6 is a plan view of another modification of the glass melting apparatus of this invention together with an associated electrical circuit.

FIG. 6 shows one example of the melting device of this invention suitable to form a uniform heated glass bath in an elongated wide area. In this example, a rectangular vessel 9 of a refractory material is used to contain the glass bath 8 and a pair of electrodes 10 and 11 are mounted on the inner surface of opposing longer side walls of the vessel, one electrode 10 having somewhat shorter length than the entire length of the side wall and is being connected to one pole of the source of supply E. Whereas the other electrode 11 is divided into seven equal sections each connected to the other pole of the source E through reactors RT.

During the initial stage of current flow the surface temperature of the bath 8 melted by external heating is not uniform so that resistances between various pairs of electrodes 10 and 11 are not uniform. Due to this difference in resistances the voltages impressed upon respective electrode sections 11 are controlled by reactors RT connected thereto so that equal current will flow throughout the entire surface layer portion of the glass bath. Thus, a low voltage will be impressed upon the electrode which is positioned at the higher temperature portion of the bath 8 whereas a higher voltage will be impressed upon the electrode at the lower temperature portion whereby the entire surface layer portion of the bath 8 is heated uniformly irrespective of non-uniform temperature conditions in the initial stage.

The spacings between divided electrodes 11 are preferably small in order to attain uniform heating of the entire surface of the bath 8. However, too small spacings results in a decrease in the electrical resistance of the molten glass contained in this space. As a consequence current of a higher voltage impressed upon a certain divided electrode will flow to adjacent electrodes thus decreasing current which must flow through low temperature portions of molten glass, or portions of higher temperature to heat them. However, such a difficulty can be avoided by cooling portions of the glass bath lying between divided electrodes to increase their resistance. Suitable cooling means comprises insertion of cooling plates provided with cooling water pipe in the bath between divided electrodes.

To initiate melting operation with the device shown in FIG. 6 it is not necessary to melt the entire surface of the bath 8 prior to current flow but any desired zone of the bath between the long electrode 10 and at least one of the divided electrodes may be heated by a burner flame and then melting by current may be initiated by impressing an appropriate voltage across these electrodes. Upon application of the voltage the temperature of said selected zone of the bath increases by the Joule heat and the voltage of the divided electrode associated with the zone will decrease as the resistance of the bath decreases. When a voltage is impressed upon a divided electrode adjacent said selected divided electrode a current path will be established through the bath 8 dependent upon the potential difference between these divided electrodes to melt the glass therebetween. Current will also flow between the long electrode 10 and the divided electrode 11 which become conductive later to widen the molten zone. When voltage has been applied to all divided electrodes the entire zone of the surface layer portion of the bath 8 will be completely melted.

Figure 7:
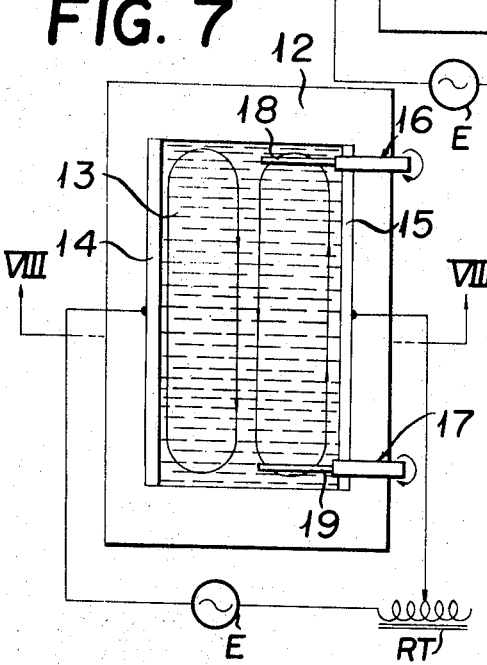
FIG. 7 shows a plan view of a further modification of this invention.
Figure 8:
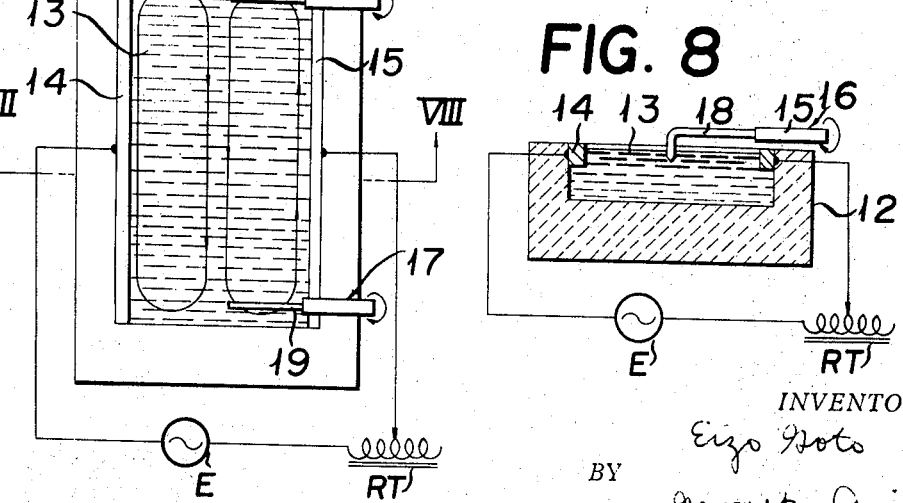
FIG. 8 is a sectional view of the apparatus shown in FIG. 7, taken along the line 8—8.

Formation of a molten glass bath of wide area is also possible by moving the surface layer portion of the bath in a direction parallel to the electrodes as shown in FIGS. 7 and 8 instead of utilizing divided electrodes. According to this modification a pair of electrodes 14 and 15 are provided on the inner surface of longer side walls of a rectangular vessel 12 at portions close to the surface layer of the bath 13, the electrode 14 being directly connected to one pole of a source E while the other electrode 15 to the other pole through a reactor RT. A pair of stirring mechanisms 16 and 17 rotated in the direction of arrows by a suitable driving mechanism (not shown) is provided adjacent shorter side walls of the vessel 12. The free ends of the stirring mechanism are bent at right angles so that they are intermittently dipped in the bath as they are rotated.

When the surface layer portion of the bath 13 is heated by external heating the rotation of the stirring mechanism is initiated. This rotation will cause the surface layer portion of the bath 13 to flow in the direction indicated by arrows (which is parallel to electrodes 14 and 15) to equalize the temperature distribution.

The melting devices shown in FIGS. 5 through 8 can form baths of molten glass of wide area and of uniform viscosity so that they are suitable to perform working involving dipping of relatively large articles, for example, applying glass to a portion or whole of the article, forming a glass film on the opened end of the glass, and sealing with glass adjoined portions.

Figure 9:
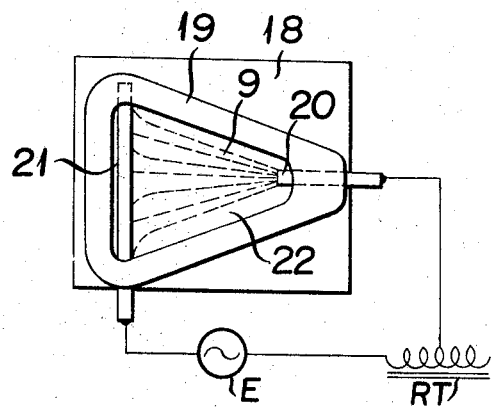
FIG. 9 is a plan view of another glass melting apparatus of this invention together with an associated electrical circuit.
Figure 10:
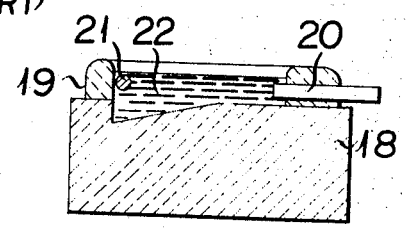
FIG. 10 shows a cross-section of the apparatus shown in FIG. 9, taken along the line 10—10.

FIGS. 9 and 10 illustrate another modification of this invention which is designed to provide effective heating of at least a portion of the surface layer without accompanying undesirable change of the electrodes. This modification comprises a base 18 of refractory bricks and a triangular frame member 19 made of sintered chamotte mounted on the base. A rod shaped electrode 20 made of a refractory metal, for example molybdenum, is provided so as to extend through one apex of the frame member 19 and is connected to one pole of a source E through a reactor RT. On the inner surface of a side wall opposite said apex there is provided a horizontal electrode 21 of a metal rod made of molybdenum and the like, said electrode 21 being slightly spaced from the side wall and connected to the other pole of the source E. A recess which increases in depth toward the electrode 21 is formed on the surface of base 18.

The glass raw material 22 is charged in the frame member 19 to a depth sufficient to cover electrodes 20 and 21 and the raw material is initially melted by external heating as in the foregoing embodiments. Thereafter, a voltage is impressed across electrodes 20 and 21 to pass current through the bath 22. However, since one electrode 21 makes contact with the bath 22 over a wide area, the current density in the bath adjacent this electrode 21 is relatively low so that the temperature of these portions is relatively low. However, the cross-sectional area of the current path gradually decreases toward the other electrode located in the narrow apex so that current concentrates as shown by dotted lines in FIG. 9 thus greatly increasing the current density in these portions to effectively heat these portions of the bath 22 to a high temperature. Such an effective heating ensures compensation for temperature drop due to adsorption of heat by a body of relatively large heat capacity dipped in the bath 22.

In this embodiment it is important to note that the temperature of the portions of the bath 22 in contact with the long electrode 21 is lower than that of the narrow apex portion, which means that the change of the electrode is greatly alleviated. Considering the fact that the other electrode 20 is worn at its tip, this greatly reduces the cost as well as labor required for maintenance and repair of the melting device.

Figure 11:
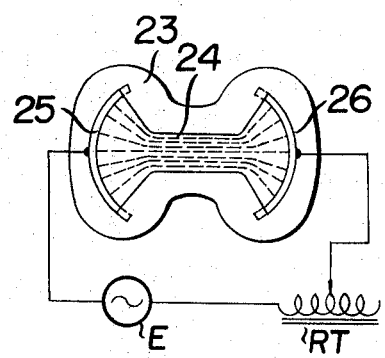
FIG. 11 shows a plan view of yet another modification of this invention together with an associated electrical circuit.

FIG. 11 illustrates another example of the melting device including a narrow portion. The frame member 23 is generally of a dumbbell shape comprising a narrow or restricted section and a sector shaped end sections contiguous thereto. A pair of arcuate electrodes 25 and 26 are provided in the sector shaped end section to contact with the bath 24 contained in the frame member. Again the electrode 25 is connected to one pole of the source E while the other electrode 26 to the other pole via a reactor RT.

In this embodiment the current density between electrodes 25 and 26 is high in the narrow portion and low in the sector shaped end sections because current flows radially therein. Accordingly, the temperature of the bath 24 is low in these end sections and high in the narrow section. Therefore, even when the bath is heated in the narrow section to a temperature to provide low viscosity suitable for working, the temperature of the bath in the sector shaped end sections is sufficiently low not to erode the electrode material.

Figure 12:
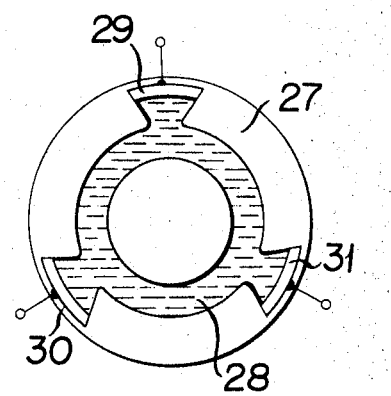
FIG. 12 is a plan view of further modification of this invention together with an associated electrical circuit.

FIG. 12 shows a modified embodiment adapted to be utilized for an operation wherein an annular portion of an article to be worked is dipped in the bath of molten glass. A vessel 27 of refractory material is provided with an annular recess on its upper surface to contain a bath 28, which is provided with three dove-tail shaped notches. At the bottom of these notches and near the surface layer there are provided arcuate electrodes 29, 30 and 31 which may be connected to a source of three phase supply (not shown) through reactors (not shown) to supply electric current through the annular recess to heat the bath. Again the surface layer of the bath is widened toward respective electrodes 29, 30 and 31 so as to be able to effectively heat the bath contained in the narrow recess without overheating electrodes.

What is claimed is:

1. An apparatus for melting glass comprising a vessel adapted to contain a mass of molten glass having a generally rectangular surface, a first long electrode disposed adjacent one of the longer sides of said rectangle and disposed on said bath closely adjacent to the level of molten mass in said vessel, said first electrode extending substantially the entire length of said longer side; a second electrode comprising an array of linearly arranged short length electrode sections disposed in said molten mass, each of said sections of said electrode lying parallel to said first electrode and to said longer side, the length of siad first electrode extending between both ends of said array means to supply an electric current between said first electrode and said array of sections of said second electrode across the surface layer portion of a mass of molten glass in said vessel; and ballast impedance means electrically inserted between each of said short electrode sections and said electric current supply means.

2. An apparatus for melting glass according to claim 1 wherein each of said short electrode sections have a length shorter than the distance between said first electrode and each of said short electrode sections.

References Cited

UNITED STATES PATENTS

| | | | |
|---|---|---|---|
| 1,878,591 | 9/1932 | McIntosh | 65—346 XR |
| 1,880,541 | 10/1932 | Wadman | 65—135 |
| 2,293,948 | 8/1942 | Peyches. | |
| 2,350,734 | 6/1944 | Dumarest | 65—136 XR |
| 2,808,446 | 10/1957 | Lambert | 65—135 |
| 2,921,106 | 1/1960 | Arbeit | 65—136 |
| 2,993,079 | 7/1961 | Augsburger | 65—346 XR |
| 3,268,320 | 8/1966 | Penberthy | 65—135 XR |
| 2,313,217 | 3/1943 | Borel. | |
| 3,417,186 | 12/1968 | Blumenfeld | 13—6 |

FOREIGN PATENTS 78,670     1950     Czechoslovakia.

FRANK W. MIGA, Primary Examiner

U.S. Cl. X.R.

13—6; 65—135, 346, 347, 356